United States Patent
Kishino

[15] 3,660,702
[45] May 2, 1972

[54] DIRECT-COOLED ROTOR FOR ROTARY ELECTRIC MACHINES

[72] Inventor: Tatsuo Kishino, Hitachi, Japan
[73] Assignee: Hitachi, Ltd., Tokyo, Japan
[22] Filed: May 4, 1971
[21] Appl. No.: 140,206

[30] Foreign Application Priority Data

May 11, 1970 Japan.....................................45/39319

[52] U.S. Cl................................................310/61, 310/64
[51] Int. Cl........................................................H02k 1/32
[58] Field of Search..............................................310/54–65

[56] References Cited

UNITED STATES PATENTS 2,129,535   9/1938   Pohl...........................................310/64

2,791,707   5/1957   Willyoung................................310/61
2,986,664   5/1961   Willyoung et al........................310/61

FOREIGN PATENTS OR APPLICATIONS 813,728   9/1951   Germany..................................310/64

Primary Examiner—D. F. Duggan
Attorney—Craig, Antonelli & Hill

[57] ABSTRACT

A direct-cooled rotor for rotary electric machines in which the rotor coils are formed with radial vents to allow cooling gas to flow out therethrough for direct cooling of the coils, said vents being radially defined by the coils in such a manner that in the axially central portions of the rotor body they extend uprightly outward and in the rest of the rotor body they extend inclinedly toward the central holes, some inclined vents adjacent each central hole communicating at one ends to said central hole in a herringbone pattern, so that the rotor can be evenly cooled across the lengths of coils set in the rotor body.

4 Claims, 8 Drawing Figures

Patented May 2, 1972

INVENTOR

TATSUO KISHINO

BY Craig, Antonelli & Hill

ATTORNEYS

Patented May 2, 1972

INVENTOR

TATSUO KISHINO

BY Craig, Antonelli & Hill

ATTORNEYS

DIRECT-COOLED ROTOR FOR ROTARY ELECTRIC MACHINES

This invention relates to improvements of a cooling system for rotor coils, which coils are accommodated in coil slots of a rotor, such as of a turbine generator. More particularly the invention relates to improvements of a cooling system for so-called direct-cooled rotor in which the conductors forming the coils are so wound as to provide vents through which a coolant is directly flown for heat exchange.

In general, so far as electric machines are concerned, we may well say that the capacity or power output of each machine is always limited by the highest temperature it can withstand in operation.

This means that, theoretically, an electric machine small in size but capable of producing a great power output can be easily obtained by constructing it of sufficiently heat-resistant materials. However, at least at the present time, it is next to impossible to procure such materials which satisfy the heat-resistance requirements of all parts.

The most practical makeshift devised so far is to cool the heat developing parts of the electric machine lest its essential mechanism should become too hot. This has become standard practice for many electric machines.

Just the same is the case with rotary electric machines, such as turbine generators. Only if the armature, its winding and field coils are adequately cooled, a rotary machine will be able to gain added power output through application of an increased exciting current to the rotor.

Main heat developing sources of a rotary electric machine are its armature coils and field coils. Usually the coils on the stator side which are kept stationary are rather easily provided with cooling means. On the other hand, the coils on the rotor side which revolve with the rotor present a number of knotty problems in connection with the centrifugal forces and hence mechanical strength of the parts to constitute the cooling means.

The present invention is directed specifically to cooling of the coils on the rotor side.

Usually the rotors of large-capacity machines, excepting some special models, are cooled by use of a gaseous medium, such as hydrogen or air.

And not a few cooling means for rotor coils have heretofore been invented, some of them being in use today. Nevertheless, it is still difficult to obtain cooling means for rotor coils which are fully satisfactory in the easiness of manufacture, price aspect, and cooling efficiency.

Of the cooling means thus far commercially accepted, the one which has been believed to achieve the highest cooling efficiency is direct cooling means, so called because the coil conductors are formed with desired ventilation slots or vents for cooling through direct contact with a cooling gas. The direct cooling means is available in a variety of forms.

One such conventional means has double rows of oblique vents radially defined by coil conductors, the vents of each row being formed crosswise like a figure eight, so that cooling gas is taken in through an air gap between the rotor and stator, passed through the vents in a figure eight arrangement thereby cooling the coil conductors, and then discharged in an air gap of a frame remote from the gas inlet side. This is known as gap pick system. According to another known system, a cooling gas is taken from both ends of the rotor into ventilation grooves preformed at the bottom of coil slots, and vents of coil conductors are communicated radially to permit the air which has cooled the coil conductors to be discharged into an air gap in the vicinity of the longitudinal center of the rotor body.

The former is complicate in construction and necessitates means to partition the air gap on the stator side for the cooling of the rotor. Moreover, because cooling gas is taken from the periphery of the body inward or is discharged therefrom, a large number of those inlets or outlets must be shaped to such special contours that very great technical skill and high cost are required.

The latter is rather inexpensive and easy to manufacture, but the long rotor body tends to produce a draft at a high pressure of cooling gas in the middle portion of the body. In other words, the cooling gas is forced into the ducts provided in the middle portion of the body, making it difficult to accomplish uniform cooling of the rotor throughout its length. In addition, the coil ends extending beyond the body can hardly be cooled in a direct way because the coil retaining rings render it impossible to provide any ducts for the cooling medium.

The present invention brings a simplest and most ideal direct-cooled rotor which can overcome all of the foregoing difficulties and realize the following objects.

It is an object of the present invention to provide a rotor having coils capable of adequately accomplishing heat exchange, which is simple in construction with no need of machining or otherwise shaping the vents for coil conductors to any special contours.

Another object of the invention is to provide a rotor in which the ununiformity of cooling effects that are achieved by a number of vents formed in the coil conductors is minimized and the very long coils distributed in coil slots can be cooled to an approximately even temperature.

Still another object of the invention is to provide a rotor in which the coil ends disposed near the rotor ends can be thoroughly cooled without any special machining or construction.

Generally, the present invention realizes these objects by provision of a rotor which comprises a rotor shaft carrying a rotor body, said rotor body being formed with axially extending coil slots near the periphery thereof, each of said slots having a ventilating groove at the bottom, coils accommodated in said coil slots, each of said coils being provided with a plurality of radially extending vents disposed at desirable intervals axially of the rotor body, and wedges formed with holes to match the vents of said coils said vents being so distributed that, in each coil slot, the vent in substantially the middle part axially of the body extends uprightly outward while all other vents are inclined toward the central vent, those adjacent the central vent being partly intersected and communicated therewith in a herringbone pattern.

The present invention will be better understood from the following detailed description taken in conjunction with the accompanying drawings.

Figure 1:
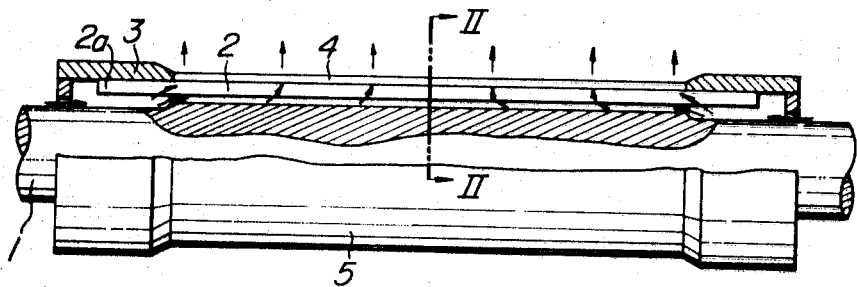
FIG. 1 is a side elevational view, partly broken away, of a direct-cooled rotor embodying this invention.

Referring now to FIG. 1, there is shown a portion of a rotor, for example in a turbine generator, as consisting of a rotating shaft 1, coil 2, coil retaining ring 3, and wedge 4. The rotating shaft 1 is rotatably journaled at both ends in bearings not shown. About the middle part longitudinally of the shaft is carried a body 5. As can be seen from an enlarged section in FIG. 2, a coil slot 6 is axially formed through the body portion from the peripheral surface thereof.

A plurality of such coil slots 6 are provided at suitable intervals along the periphery of the body 5. At the bottom 7 of each slot 6 is formed a ventilating groove 8, which too extends axially.

Near the open end of the coil slot 6 is formed a slot 9 of larger diameter to accommodate a wedge 4.

In each coil slot 6 formed in this way is inserted a coil 2, which is surrounded by an insulation 10, and a wedge 4 rests above the coil to keep it immovably within the coil slot.

Each coil 2 consists of a coil conductor 11 wound in such a manner that, when a coil slot is cross sectioned, it looks as if several coil conductors 11 are laminated together. Of course those conductor layers are insulated from each other by insulating means not shown.

Through the coil conductor lamination are formed vents 12 extending radially outward. Each vent 12 communicates at one end (at the bottom as viewed in FIG. 2) to the ventilating groove 8 formed below the bottom 7 of the coil slot 6 and at the other end, to the ventilating hole 13 of the wedge 4.

Figure 2:
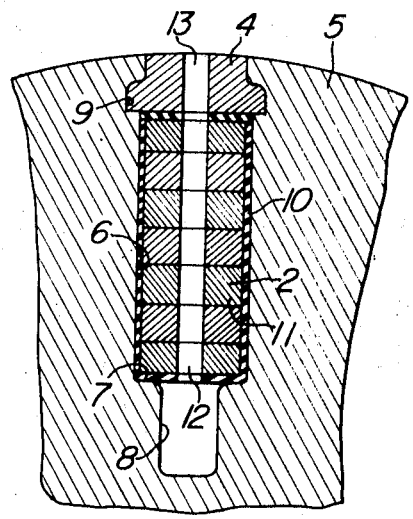
FIG. 2 is a sectional view taken on the line A—A of FIG. 1.

Here it must be noted that, although the vent in FIG. 2 is shown as formed radially or perpendicularly to the periphery of the rotor body, it actually represents a certain vent (formed in the middle longitudinally of the body) and all the rest are not radially upright.

As regards the formation of the vents, explanation will now be made in connection with an embodiment of the invention illustrated in FIG. 3, which is a diagrammatic view of a section of a rotor body 5, and in FIG. 4, which is a fragmentary sectional view of the middle portion of the rotor body. In both figures there are shown a coil 2, ventilating groove 8, and vents 12.

As shown, the vents 12 are formed in the coil 2 in such a manner that the central vent 12a provided in the axial center of the body 5 extends radially upright or perpendicularly to the periphery of the rotor body, while the other vents 12b are all inclined toward the vent 12a in a herringbone pattern.

In the manner described, the vents 12a and 12b intricately intersect one another in about the middle portion of the body. These intersections play a very important role.

The role to be played will be described later. Next, the flow of cooling gas, e.g., hydrogen or air, will be explained.

Figure 3:
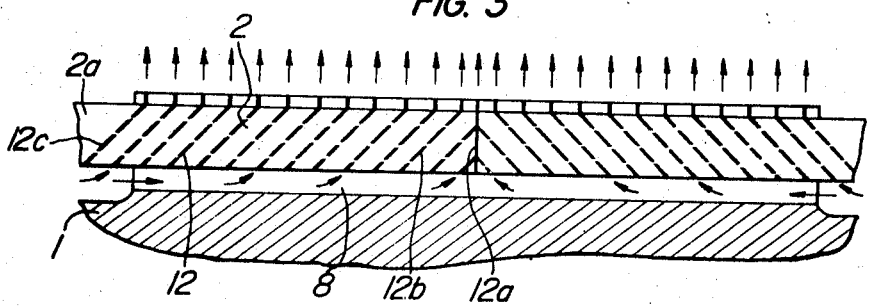
FIG. 3 is a longitudinal sectional side view of a rotor body.
Figure 4:
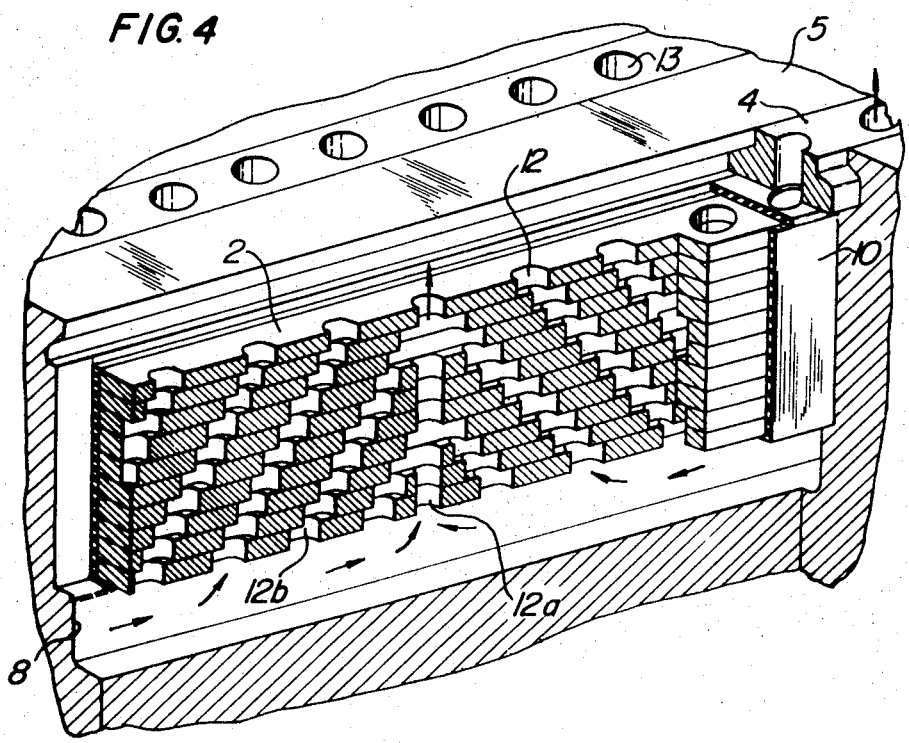
FIG. 4 is a perspective view, partly broken away, of a portion about the middle of the rotor body.
Figure 5:
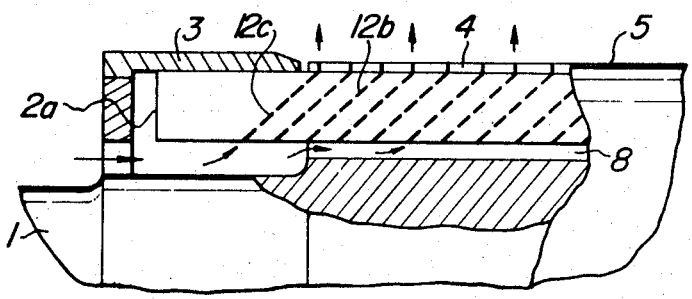
FIG. 5 is a side elevational view, partly broken away, of an end portion of the rotor body.

In FIGS. 3 arrow marks indicate the flow of the cooling medium. By fans not shown, the gas is forced into the body, or into the space below the coil ends 2a through the space between the rotating shaft 1 and the coil retaining ring 3. (See FIG. 5.) A part of the cooling gas is discharged through vents 12c formed at the coil ends towards the periphery of the body 5.

The rest of gas flows into the ventilating groove 8 and thence into the vents 12b and 12a.

By the gas flown in this way the coil conductors 11 are cooled through heat exchange. Although explanation has been made in this case as if the cooling gas flows into the vents near the body ends and thence sequentially into the adjacent vents up to the central vent, the gas actually exhibits a phenomenon in which it is concentrated with an increased pressure in the middle part of the body. The gas pressure drops gradually towards the ends of the body, and the excess gas not discharged through the central vent and the neighboring vents escapes through the vents near the body ends.

In view of the foregoing it may appear that a comparatively large amount of cooling gas flows through the vents in the neighborhood of the central vent and inadequate supply of the gas to the body ends is accordingly reduced with the possibility of ununiform cooling throughout the total length of the individual coils. However, according to this invention, any such uneven cooling is avoided because the vents of the coils provided near the middle part of the body intersect the vents formed perpendicularly to the radial direction of the body.

Figure 7:
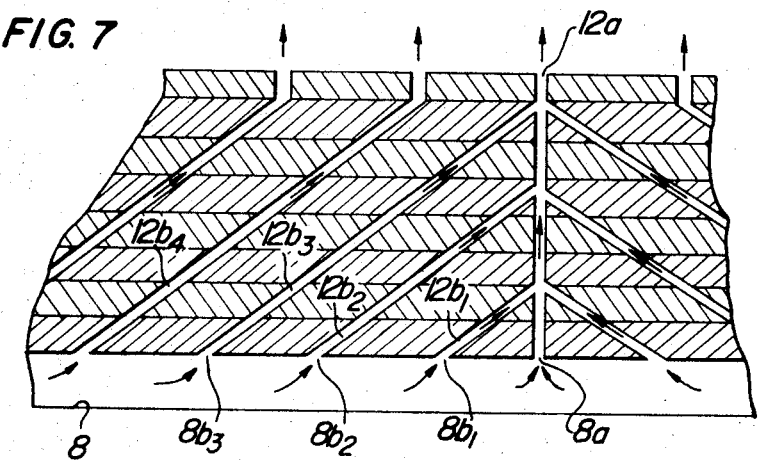
FIG. 7 is a view explanatory of the ventilation system in and about the middle portion of the rotor body.

This will be better understood by the following description taken in conjunction with FIG. 7 which diagrammatically shows the middle portion of the body. Let the central vent be 12a and the neighboring vents tilted against the central vent be $12b_1$, $12b_2$, $12b_3$, $12b_4$ and so forth in the increasing order of distance. Then, in the groove region 8a where the draft pressure is the highest, the cooling gas tries to flow fast through the vent 12a to escape to the outside. However, the neighboring vents $12b_1$, $12b_2$ and $12b_3$, which intersect the vent 12a and discharge the cooling gas into the central vent, provide sufficient resistance to control the flow rate in the central vent as if by a throttle device.

The flow rates in the neighboring vents $12b_1$, $12b_2$ and $12b_3$ are likewise controlled. The draft pressures in the groove regions $8b_1$, $8b_2$ and $8b_3$ are not the same. However, because the vent $12b_3$, for example, which is formed adjacent the ventilating groove region $8b_3$ where the draft pressure is lower than in the groove region 8a intersects the vent 12a near the periphery of the body, its flow resistance is low and therefore the amounts of gas that flow through the neighboring vents $12b_1$ and $12b_2$ are little different. It will be clear from this that these intersections should not be provided at random but that the choice of the intersecting points on the basis of experiments or calculations is essential.

Although an embodiment has been described for the provision of vents in coils, various other means would be conceived to form vents to attain the same effect.

Figure 6:
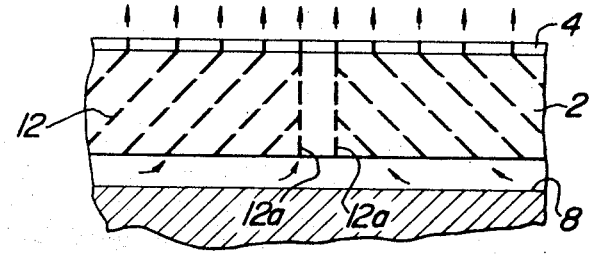
FIG. 6 is a longitudinal sectional view of a portion about the middle of the rotor body of another embodiment.

Another embodiment of the invention is illustrated in FIG. 6. In the embodiment shown there are provided a plurality of radially upright vents 12a in the middle portion of the body. These vents are adjoined with inclined vents with the upright vents serving the same throttling purpose as in the preceding embodiment.

Figure 8:
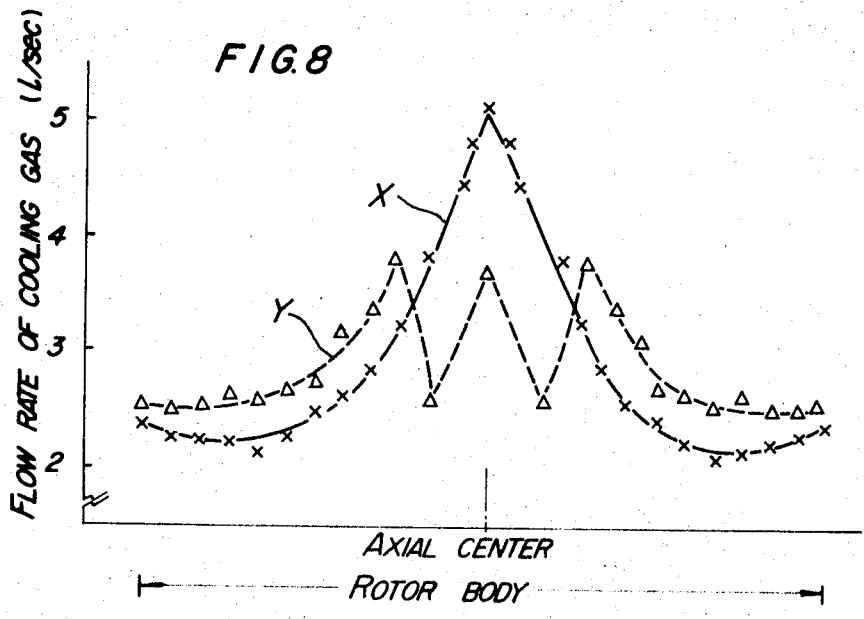
FIG. 8 is a graph illustrating the ventilation in terms of air supply for cooling of rotor body.

In the graph of FIG. 8, the ventilation effects achieved in a conventional rotor formed with radial vents alone and in a rotor according to the present invention are compared.

The graph illustrates the relationship between given axial points of the rotor bodies and the flow rate of cooling gas.

The solid-line curve X represents a conventional body. It can be seen that the flow rate sharply increases in the middle portion of the body, while the flow rates in the body ends and the regions between the body ends and the center are very low.

By contrast, the dash-line curve Y according to the present invention indicates a fairly uniform flow rate throughout (as compared with the sharp irregularity in the conventional rotor).

As described in detail above, the direct-cooled rotor of the present invention is so constructed that the vents for coil conductors disposed in the axial middle part of the rotor body are upright and perpendicular to the periphery of the body and the other vents are all inclined toward the central vents, some of the other vents closer to each central vent intersecting the same. Therefore, vents can be formed even in the coil ends extended beyond the body ends, and the coil ends which are normally cooled under the coil retaining rings can now be adequately cooled by a most efficient direct-cooling means. Because the neighboring vents intersect the central vents in the vicinity of the periphery of the body, the outlet ports of the cooling gas are throttled, and therefore the usual disadvantage of the flow of cooling gas only through the middle portion of the body due to a high draft pressure can be eliminated without resort to any special means. Thus the coils can be cooled to a substantially even temperature throughout.

While certain embodiments of the present invention have been herein described and illustrated, it is to be understood of course that the invention is applicable to other embodiments and numerous other modifications and variations are possible without departing from the spirit and scope of the invention.

I claim:

1. A direct-cooled rotor for rotary electric machines which comprises a rotor shaft carrying a rotor body, said rotor body being formed with axially extending coil slots near the periphery thereof, each of said slots having a ventilating groove at the bottom, coils accommodated in said coil slots, each of said coils being provided with a plurality of radially extending vents disposed at desirable intervals axially of the rotor body, and wedges formed with holes to match the vents of said coils, said vents being so distributed that, in each coil slot, the vent in the axially middle portion of the body extends radially upright while all other vents are inclined toward the central vent, the vents neighboring the central vent intersecting or communicating therewith in a herringbone pattern.

2. A direct-cooled rotor for rotary electric machines according to claim 1 wherein a plurality of vents formed in and about the axial middle portion of the body are radially upright, while other vents are formed so as to incline against the upright vents, the neighboring vents intersecting the nearer or nearest upright vent.

3. A direct-cooled rotor for rotary electric machines according to claim 1 wherein the vents formed in the coils are inclined toward the middle portion of the rotor body in such a manner that they intersect one another in and about the middle portion of the body.

4. A direct-cooled rotor for rotary electric machines according to claim 1 wherein the vents formed in the coils are inclined toward the middle portion of the rotor body and the vents formed near the body ends extend through the coil ends disposed in the coil retaining rings.

* * * * *